(12) United States Patent
Leen

(10) Patent No.: US 6,781,129 B2
(45) Date of Patent: Aug. 24, 2004

(54) DUAL EYE MOTION DETECTOR ASSEMBLY

(76) Inventor: Monte A. Leen, 11730 NE. 12th St., Bellevue, WA (US) 98005

(*) Notice: Subject to any disclaimer, the term of this patent is extended or adjusted under 35 U.S.C. 154(b) by 0 days.

(21) Appl. No.: 09/927,707

(22) Filed: Aug. 10, 2001

(65) Prior Publication Data

US 2002/0020816 A1 Feb. 21, 2002

Related U.S. Application Data

(60) Provisional application No. 60/224,860, filed on Aug. 11, 2000.

(51) Int. Cl.[7] .................................................. G01J 5/02
(52) U.S. Cl. ...................................... 250/342; 362/276
(58) Field of Search ................................. 250/342, 349, 250/353, 347; 362/276, 281, 282, 283, 418, 390

(56) References Cited

U.S. PATENT DOCUMENTS

| 5,128,654 A | * | 7/1992 | Griffin et al. ................ 340/567 |
| 5,258,899 A | * | 11/1993 | Chen .......................... 362/394 |
| 5,381,323 A | * | 1/1995 | Osteen et al. ................ 362/276 |
| 5,418,368 A | | 5/1995 | Sandell et al. |
| 5,453,622 A | | 9/1995 | Sandell et al. |
| 5,649,761 A | | 7/1997 | Sandell et al. |
| 5,657,721 A | * | 8/1997 | Mayfield et al. ............. 119/707 |
| 5,662,411 A | * | 9/1997 | Haslam et al. ............... 362/276 |
| 5,757,004 A | * | 5/1998 | Sandell et al. ............... 250/347 |
| 6,030,095 A | * | 2/2000 | Moore et al. ................ 362/226 |
| 6,309,090 B1 | * | 10/2001 | Tukin ......................... 362/276 |
| 6,466,826 B1 | * | 10/2002 | Nishihira et al. ............. 700/17 |

FOREIGN PATENT DOCUMENTS

WO    WO 97/07361 A1 *   2/1997   ........... F21V/23/04

* cited by examiner

Primary Examiner—Albert Gagliardi
(74) Attorney, Agent, or Firm—Dean A. Craine

(57) ABSTRACT

A dual eye motion detector assembly comprising a main infrared sensor head and a secondary infrared sensor head mounted on a mounting box. The main motion sensor head is pivotally mounted to the mounting box and contains a standard infrared motion sensor with an approximate 90 to 180 degree viewing zone. The secondary motion sensor head is also pivotally and independently mounted to the mounting box and contains its own standard infrared motion sensor with an approximately 90 to 180 degree viewing zone. The two motion sensors in the main and secondary motion sensors heads are connected to a circuit panel located the main sensor head. Control switches are mounted on the sides of the main infrared sensor head to control sensitivity and timing. Outside electrical current is delivered to the circuit panel and divided into local circuits to control the operation of at least one lamp so that when an infrared-emitting object passes into the viewing zone of either sensor head, the lamp is automatically activated.

7 Claims, 5 Drawing Sheets

US 6,781,129 B2

DUAL EYE MOTION DETECTOR ASSEMBLY

This is a utility patent application based on a provisional patent application (Ser. No. 60/224,860) filed on Aug. 11, 2000.

BACKGROUND OF THE INVENTION

1. Field of the Invention

This invention pertains to motion detectors and, more particularly to motion detectors with adjustable wide viewing areas.

2. Description of the Related Art

Motion detector lighting controls that include an infrared sensor box and a pair of lamp holders, all rotatably mounted to a mounting box, have been known for years. When an infrared emitting object, such as an animal, enters the viewing zone of the infrared sensor located inside the infrared sensor box, the lamps connected to the infrared sensor are automatically activated to illuminate the desired area at which the lamps are aimed. When the object leaves the viewing zone, the lamps automatically turn off after a pre-determined amount of time.

One problem with such controls is that the viewing angle of the sensor box is limited to approximately fifty (50) feet on both sides of the normal axis of the lens of the sensor box (110 degrees total). When the infrared emitting object approaches the light fixture from an angle outside the viewing zone, the lamps are not automatically activated.

U.S. Pat. Nos. 5,418.368 and 5,453,622 disclose wide-angle motion detectors designed to extend the viewing zone greater than 180 degrees by using a plurality of inclined infrared mirror faces designed to direct sufficient intensity of radiation to the sensor from outlying angles. Such detectors use two or more infrared-reflecting faces which are positioned close to, and overlie at least a portion, of the sensor. The reflecting faces are configured so that their ends proximal to the sensor overlie the sensor at its midpoint and the faces extend from the mid-point in different directions away from one another to reflect radiation to the sensor from different sides of the sensor. Unfortunately, the lenses and reflective faces used on such detectors may become dirty or fogged over time, which reduces sensor operation Another drawback with using wide-angle single detectors is that the user is unable to split the coverage area into smaller coverage areas. In some instances motion detectors are used in a long narrow environment such as a walkway, where they are used to activate a floodlight, mounted on an adjacent wall, when an object enters the walkway from either end. Since an object may enter the walkway from either end, a wide-angle detector must be aimed at the middle axis between the two ends so that motion at each end of the walkway is detected. Motion detection near or along the middle axis is not necessary. In other instances, it may be desirable to exclude a middle section of the wide coverage from detection.

Another drawback with single wide angle motion detectors is that their viewing fields have uniform height or depth. The heights or depths of sections in their viewing fields can not be selectively adjusted. Such an adjustment feature would be desireable, for example, when detecting movement in a stairway or its lower landing area.

SUMMARY OF THE INVENTION

It is an object of the present invention to provide a motion detector assembly with adjustable wide viewing area.

It is another object of the present invention to provide such a motion detector assembly in which the arc and height of selected sections of the viewing areas may be independently adjusted by the user.

It is a further object of the invention to provide such a motion detector assembly that is less likely to fail over time due to dirty or fogged conditions.

These and other objects of the invention which will become apparent are met by an improved dual head motion detector assembly comprising an independently adjustable main motion sensor head and an independently adjustable secondary motion sensor head both pivotally mounted to a mounting box. Both the main motion sensor head and the secondary motion sensor head contain standard infrared motion sensors each with an approximate 110-degree viewing zone. The two motion sensors are both connected to a control panel located in the main motion sensor head with on/off switch and sensitivity control switches externally mounted thereto. The control panel is connected between at least one lamp socket and to an outside 110-volt electric circuit. When an infrared-emitting object passes into one or both viewing zones of the two motion sensors, the circuit between the control panel and the lamp socket opens thereby activating the bulb connected to the lamp socket.

When a wide, combined viewing area is desired, the main and secondary motion sensor heads are pivotally adjusted on the mounting box so that their separate viewing zones slightly overlap thereby providing a total coverage zone of approximately 330 degrees. The main and secondary motion sensor heads may be independently twisted towards their desired viewing areas and independently elevated to obtain different viewing areas depths. Also, both the main and secondary motion sensor heads use single lens infrared sensors rather than multiple lens or mirror sensors thereby making them less susceptible to dirt or fog.

DESCRIPTION OF THE PREFERRED EMBODIMENT(S)

Figure 8:
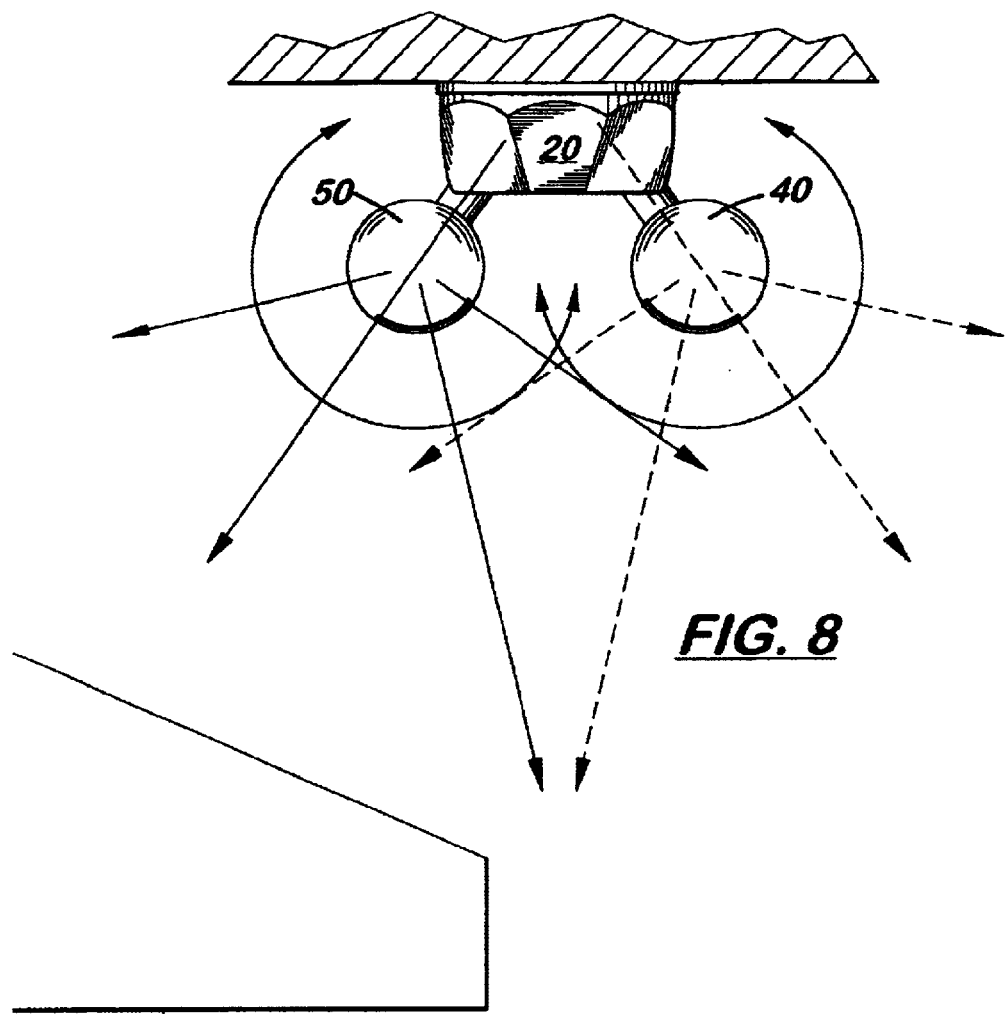
FIG. 8 is a top plan view of the assembly illustrating the motion sensor heads being horizontally adjusted to change the arc of coverage.
Figure 9:
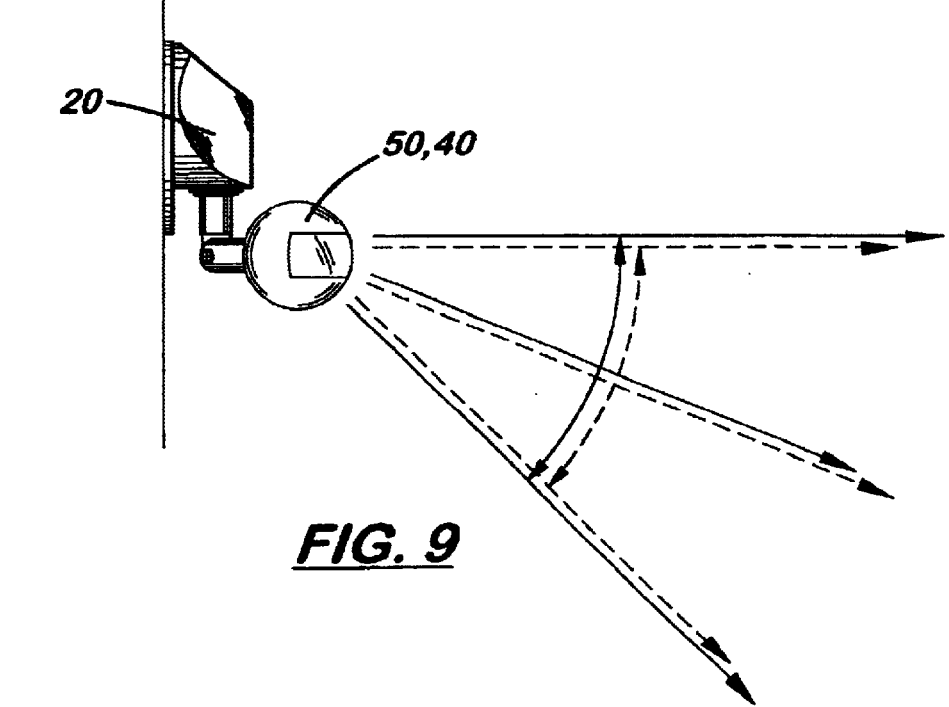
FIG. 9 is a side elevation view of the assembly showing the motion sensor heads tilted at different angles to change the depth of field coverage.

Referring to the accompanying FIGS. 1–9, there is shown and described a dual motion detector assembly 10 comprising a main motion sensor head 40 and a secondary motion sensor head 50 both mounted on a mounting box 20. Located inside the main motion sensor head 40 and the secondary motion sensor head 50 are standard, single lens motion sensors 60, 60' respectively, each designed to provide an approximate 110-degree viewing zone as shown in FIG. 8. Both the main motion sensor head 40 and secondary motion sensor head 50 are pivotally mounted to rigid arms 34, 36, respectively, that are connected to vertically aligned, rotatably adjusted posts 30, 32, respectively, that extend downward from the bottom surface 21 mounting box 20.

In the preferred embodiment, the mounting box 20 is a five-sided structure with a flat mounting plate 21 selectively attached over its rear opening 25. The bottom surface 22 of the mounting box 20 is flat and horizontally aligned and opposite a flat, diagonally aligned top surface 23. The two opposite sides surfaces 24, 26 are diagonally aligned and converge towards a flat, vertically aligned front surface. 27. Two holes (not shown) are evenly spaced apart and formed on the bottom surface 21 which connect to the proximal ends of the two posts 30, 32. Formed on each side surface, 24, 26 is a centrally aligned hole 25, 28, respectively, which connects to the arm on a standard light fixture 70, 80.

The main and secondary motion sensor heads 40, 50 both include a hollow, spherical housing 42, 52 with the arms 34, 36, respectively, attached to their rear surfaces. Front openings 44, 54, are formed on the housings 42, 52, in which transparent lens 46, 49, respectively are placed. Suitable threaded connectors 38 are used to attach the distal ends of the arms 34, 36 to the ends of the posts 30, 32, respectively.

Figure 1:
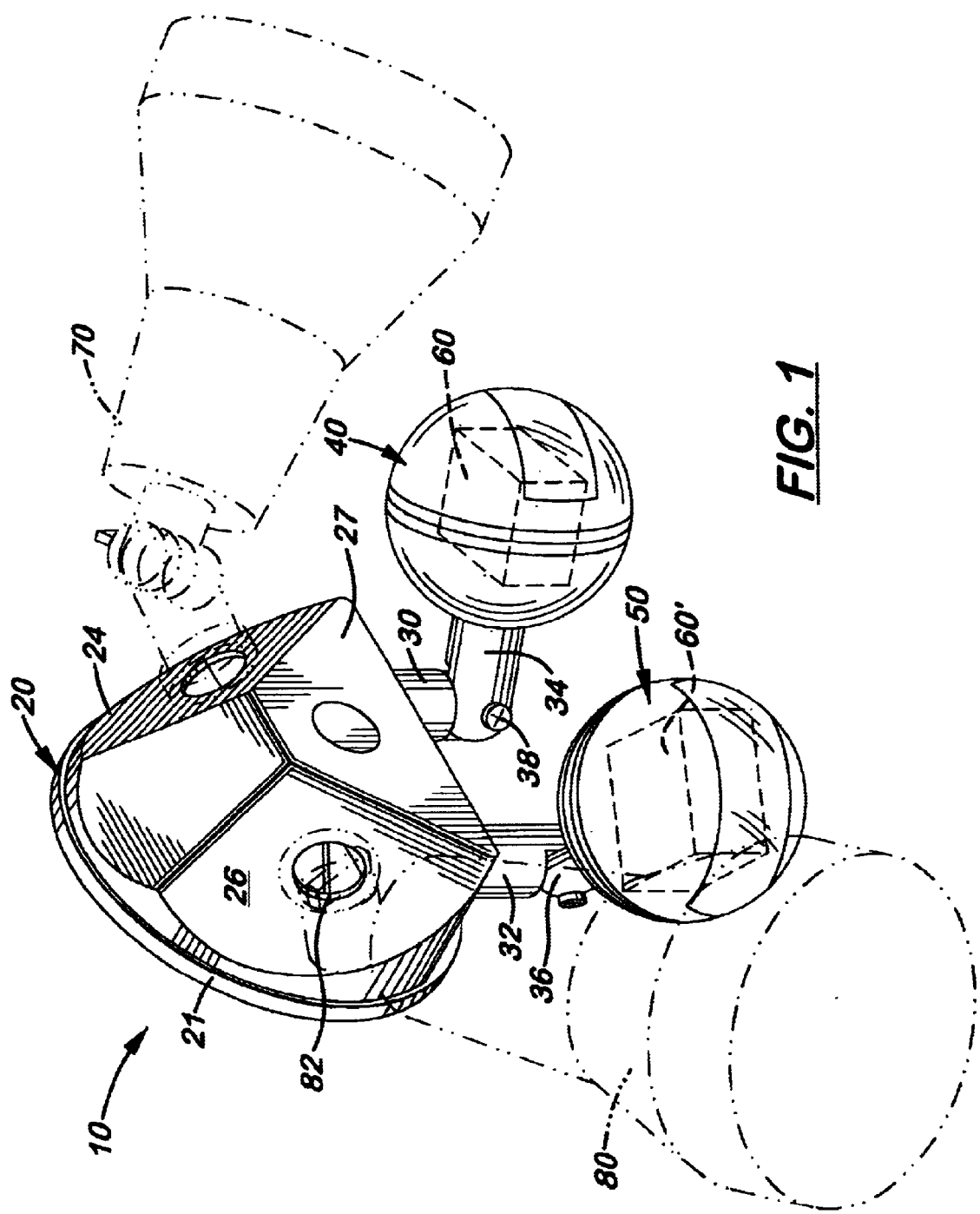
FIG. 1 is a perspective view of the dual eye motion detector assembly with lamps attached thereto.
Figure 2:
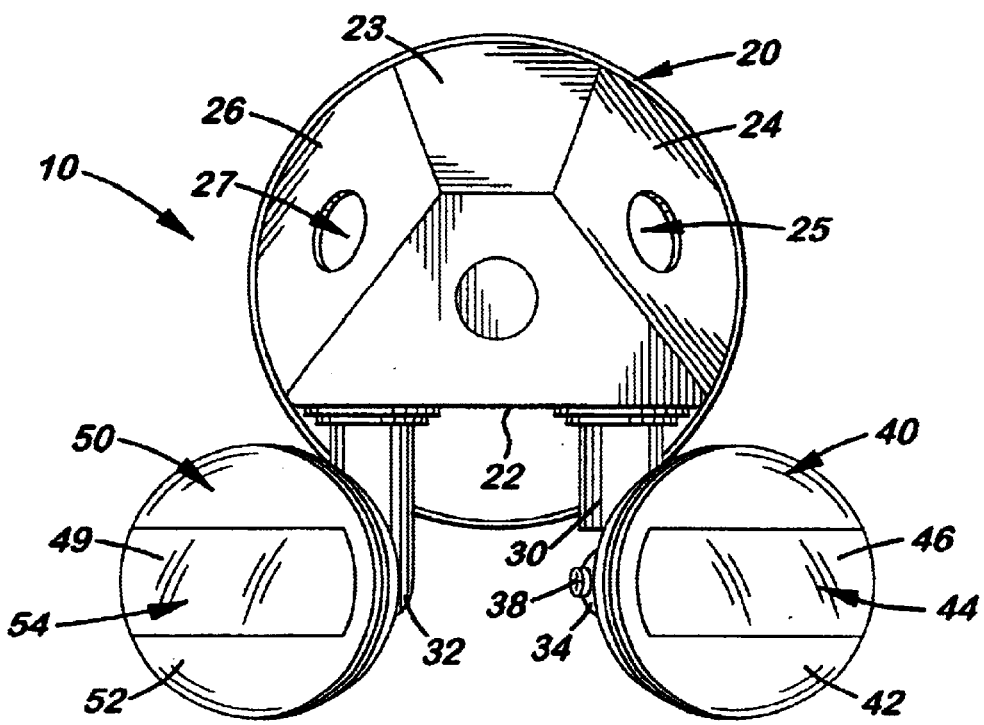
FIG. 2 is a front elevation view of the invention.
Figure 3:
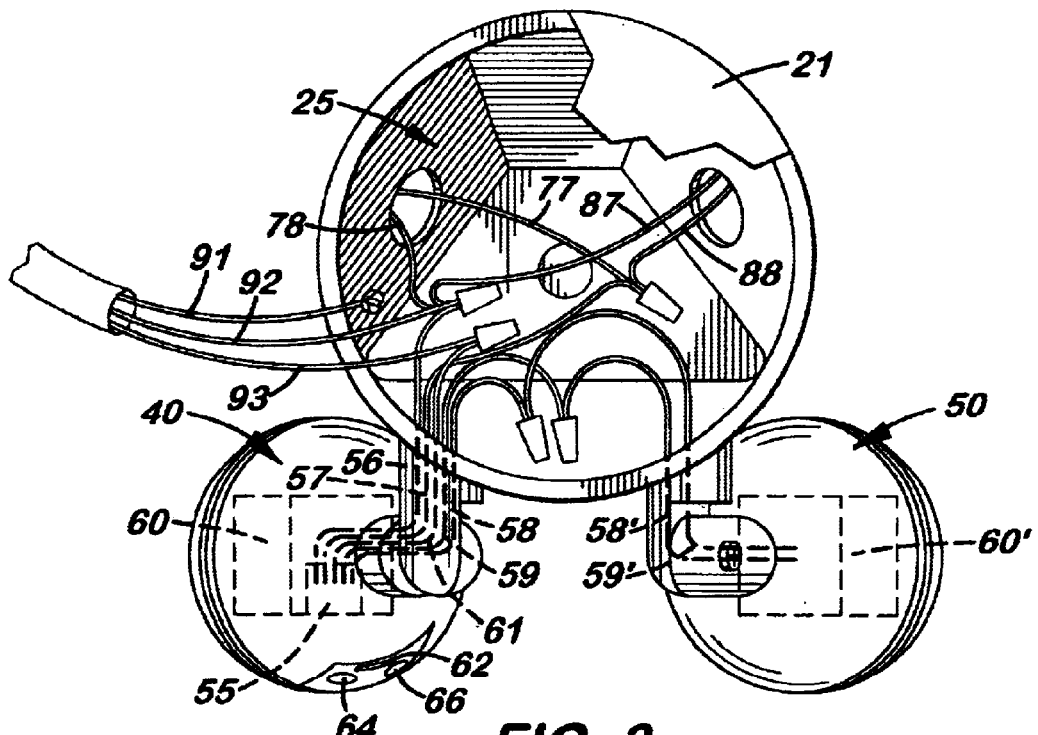
FIG. 3 is a rear elevation view of the invention.
Figure 4:
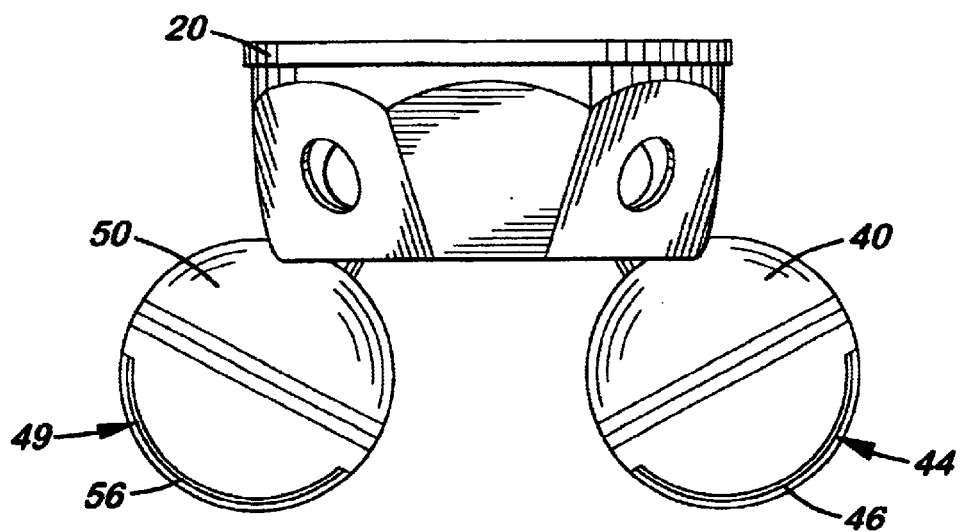
FIG. 4 is a top plan view of the invention.
Figure 5:
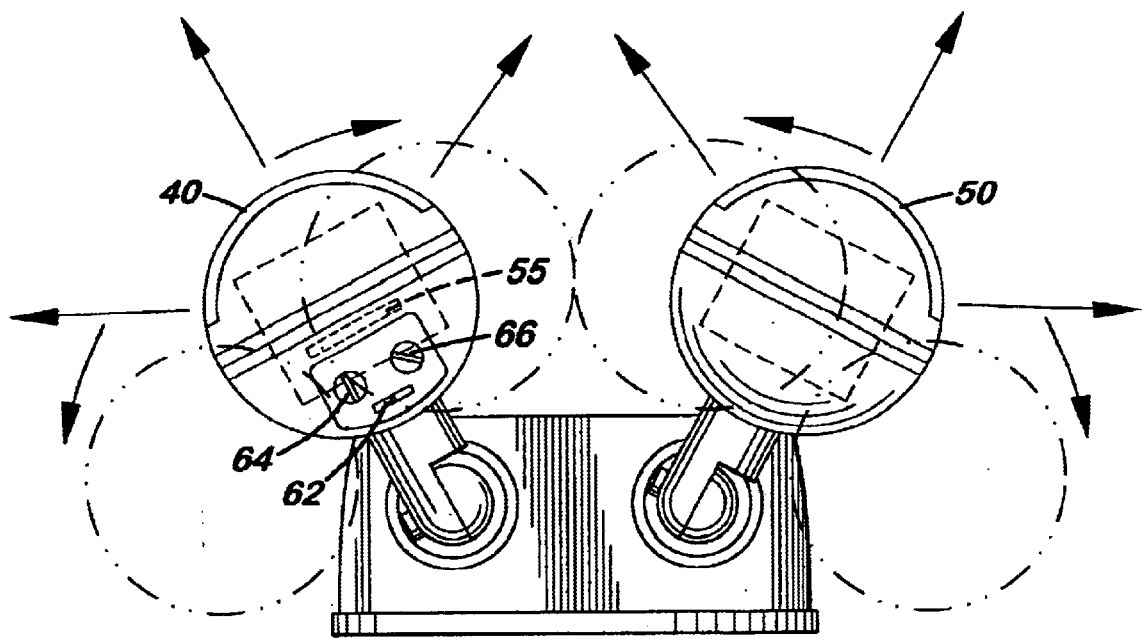
FIG. 5 is a bottom plan view of the invention.
Figure 6:
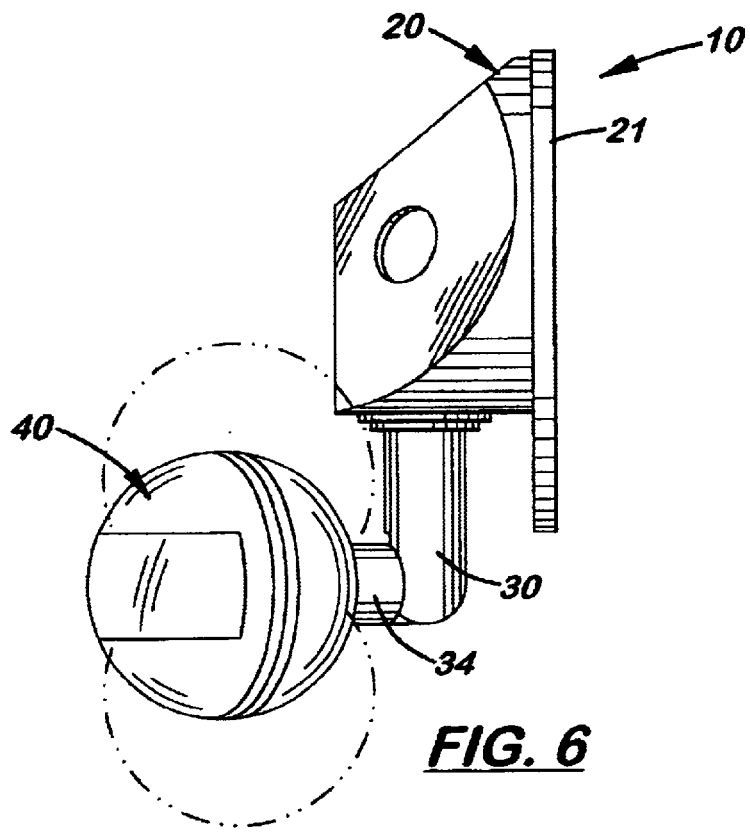
FIG. 6 is a left side elevation view of the invention.
Figure 7:
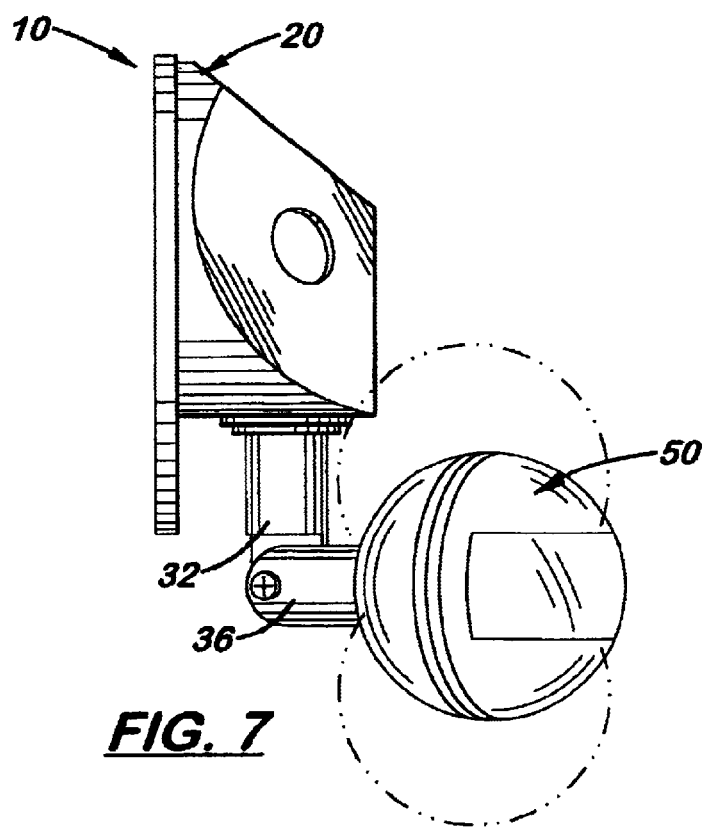
FIG. 7 is a right side elevation view of the invention.

As shown in FIGS. 3 and 5, attached to the bottom surface of the main motion sensor head 40 is a on/off switch 62 and sensitivity control buttons 64, 66 connected to a printed circuit panel 55 also located therein. Five wires 56–59, 68, extend from the main panel 55 through the arms 34, 36 and into the mounting box 20. During installation, a "black" wire 93, green wire 92, and a ground wire 91 connected at one end to the main electrical circuit of the building are extended into the mounting box 20. The "neutral" wire 91 connects to the side of the mounting box 20. The "green wire 92 connects to the two wires that extend from the two light fixtures and the second main power wire from the circuit panel 55. The "black" wire 93 connects to a first main power wire 56 that extend from the circuit panel 55. The two wires 58', 59' from the secondary motion sensor 50 connect to two wires 58, 59 extending from the circuit panel 55.

The motion sensors 60, 60' used in each sensor head 40, 50 are standard passive infrared sensors that provide approximately 90 to 180 degree or more coverage.

The main circuit panel 55 may be connected to two light fixtures 70, 80 or one light fixture (not shown) so that when an object is detected in one of the viewing fields of the motion sensors 60, 60', the both lamps are activated. It should be understood, that the circuit panel 55 could be electrically connected so that each motion sensor head 40, 50 operates one light fixture 70 or 80.

As shown in FIG. 8, during assembly, the motion sensor heads 40, 50 are pivotally adjusted on the mounting box 20 so that their respective view zones overlap approximately 20 degrees. The total view zone of both motion sensor heads 40, 50 is approximately 270 to 330 degrees thereby enabling the lamps to be automatically activated by objects approaching the motion sensors from the side or behind. Each motion sensor head 40, 50 can be elevated upward or downward approximately 30 degrees from the horizontal axis thereby enabling the height of the viewing field to be adjusted. Because each motion sensor head 40, 50 uses a standard, passive motion sensor 60, 60 without inclined mirror faces, the problem associated with dirty or fogged surfaces is not present.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A dual eye motion detector assembly, comprising:
   a. a mounting box;
   b. a main motion sensor head connected to said mounting box, said main motion sensor head containing a front opening with a motion sensor located behind and used to detect an object located in the view of said motion sensor;
   c. means to adjust the horizontal orientation of said main motion sensor head on said mounting box;
   d. means to adjust the vertical orientation of said main motion sensor head on said mounting box;
   e. a secondary motion sensor head connected to said mounting box spaced apart from said main motion sensor head, said secondary motion sensor head containing a front opening with a second motion sensor located there behind and used to detect an object located in the view of said second motion sensor;
   f. means to adjust the horizontal orientation of said second motion sensor head on said mounting box;
   g. means to adjust the vertical orientation of said second motion sensor head on said mounting box;
   h. a main panel located inside said main motion sensor head and connected to said motion sensors located in said main and said motion sensor head;
   i. at least one lamp electrically connected so said main panel to that said lamp is activated when an object is detected within the view of the first or second said motion sensor.

2. The duel eye motion detector assembly, as recited in claim 1, wherein the means to adjust the horizontal orientation of said main sensor head is an arm fixed at one end to said main motion sensor head and rotatably connected at is opposite end to the distal end of a post connected to said mounting box.

3. The duel eye motion detector assembly, as recited in claim 2, wherein the means to adjust the horizontal orientation of said secondary motion sensor head is an arm fixed at one end to said secondary motion sensor head and rotatably connected at is opposite end to the distal end of a post connected to said mounting box.

4. The duel eye motion detector assembly, as recited in claim 1, wherein said mounting box includes a flat, horizontally aligned bottom surface upon which said main and said secondary motion sensor heads are attached.

5. The duel eye motion detector assembly, as recited in claim 4, further including a second lamp electrically connected to said main panel which is activated when an object passes within view of one said motion sensor.

6. The duel eye motion detector assembly, as recited in claim 1, further including sensitivity and time adjustment switches connected to said main panel.

7. The duel eye motion detector assembly, as recited in claim 6, wherein said switches are located on said motion sensor head.

\* \* \* \* \*